(12) United States Patent
Kowalewski (10) Patent No.: US 7,042,861 B1
(45) Date of Patent: May 9, 2006

(54) METHOD AND DEVICE FOR DETECTING CDMA-CODED SIGNALS

(75) Inventor: Frank Kowalewski, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/786,945

(22) PCT Filed: Jul. 13, 1999

(86) PCT No.: PCT/DE99/02156

§ 371 (c)(1),
(2), (4) Date: Jun. 13, 2001

(87) PCT Pub. No.: WO00/16495

PCT Pub. Date: Mar. 23, 2000

(30) Foreign Application Priority Data

Sep. 11, 1998 (DE) .......................................... 198 41 578

(51) Int. Cl.
*H04B 7/216* (2006.01)

(52) U.S. Cl. ........................................ 370/335; 370/342
(58) Field of Classification Search ................. 370/320, 370/335, 342, 441; 375/136, 147, 148, 316
See application file for complete search history.

(56) References Cited

U.S. PATENT DOCUMENTS 5,724,378 A * 3/1998 Miki et al. ................... 375/148
5,757,791 A   5/1998 Kanterakis et al.
6,222,833 B1 * 4/2001 Seo ............................. 370/342

OTHER PUBLICATIONS

Wang Haifeng et al., "Joint Multifuser Detector With Decoding and Feedback In Asychronous CDM Systems", IEEE 5th International Symposium on Spread Spectrum Techniques . . . , 1988, New York, pp. 160–163, vol. 1.

M. Werner, "Multi–Stage Joint–Detectino Method Including Decision Feedback for CDMA Cellular [Mobile Radio Communication] Applications", ITG Technical Reports, VDE Publishers, Berlin, Germany, vol. 130, pp. 357–368.

Salmasi et al., "On the System Design Aspects of Code Division Multiplex Access (CDMA) Applied to Digital Cellular and Personal Communications Network," *Proc. IEEE Conf. Veh. Technol.*, St. Louis, MO, USA, May 1991, pp. 57–62.

W. van Atten: "Maximum Likelihood Receiver for Multiple Channel Transmission Systems," *IEEE Trans. Commun.*, vol. 24, (1976), pp. 276–283.

K. S. Schneider: "Detection of Code Division Multiplexed Signals," *IEEE Trans. Aerosp. Electron. Syst.*, vol. AES–15 (1979), pp. 181–185.

Lupas et al., "Linear Multi–User Detectors for Synchronous Code Division Multiple–Access Channels," *IEEE Trans. Inform. Theory*, vol. 35 (1989), pp. 123–136.

(Continued)

*Primary Examiner*—Wellington Chin
*Assistant Examiner*—Brenda Pham
(74) *Attorney, Agent, or Firm*—Kenyon & Kenyon (57) ABSTRACT

Multiuser methods of detecting CDMA-coded signals cannot be used in practice because of their high computational complexity. However, the RAKE receiver, which is simple in computing terms, offers greatly inferior detection results. Through an iterative approximation of multiuser solutions, a reduction in computing complexity is achieved in comparison with traditional multiuser methods. A first estimate of coded data is improved by iteration either until a quality criterion is met or until no more computing time is available. The field of application of this method includes, in particular, situations where CDMA-coded signals transmitted linearly are to be detected, in particular in the mobile wireless field when using CDMA methods.

8 Claims, 3 Drawing Sheets

OTHER PUBLICATIONS

Xie et al, "A Family of Suboptimum Detectors for Coherent Multi–User Communications," *IEEE J. Select. Areas Commun.*, vol. 8 (1990), pp. 683–690.

A. Duel–Hallen: "Decorrelating Decision–Feedback Multiuser Detector for Synchronous Code–Division Multiple–Access Channels," *IEEE Trans. Commun.*, vol. 41 (1993), pp. 285–290.

J. Salz: "Digital Transmission Over Cross–Coupled Linear Channels," *Bell Syst. Tech. J.*, vol. 64 (1985), pp. 1147–1159.

A. Duel–Hallen: Equalizers For Multiple Input/Multiple Output Channels and PAM Systems With Cyclostationary Input Sequences, *IEEE J. Select. Areas Commun.*, vol. 10 (1992), pp. 630–639.

Honig et al., "Suppression of Near– and Far–End C rosstalk by Linear Pre– and Post–Filtering," *IEEE J. Select. Areas Commun.*, vol. 10 (1992), pp. 614–629.

* cited by examiner

METHOD AND DEVICE FOR DETECTING CDMA-CODED SIGNALS

FIELD OF THE INVENTION

The present invention relates to a method and a device for detecting CDMA-coded signals.

BACKGROUND INFORMATION

CDMA offers the possibility of combining multiple discrete-time data streams into a total signal such that the original data streams can be recovered from this signal. Data streams can be recovered if the CDMA-coded signals are modified by different linear filters. The simplest possibility of data detection is called a matched filter. Better results are obtained with a RAKE receiver, as described, for example, by A. Salmasi, K. S. Gilhousen: "On the system design aspects of code division multiplex access (CDMA) applied to digital cellular and personal communications network," *Proc. IEEE Conf. Veh. Technol.*, St. Louis, Mo., USA, May 1991, pages 57–62. These detectors require only a knowledge of the code of the data stream to be detected. If the codes of the data streams not to be detected are also known, interference caused by foreign data streams (due to non-orthogonal codes) can be determined and eliminated. CDMA detection can be improved significantly by appropriate multiuser methods. In addition to the optimal maximum likelihood detector, described, for example, by W. van Atten: "Maximum likelihood receiver for multiple channel transmission systems," *IEEE Trans. Commun.*, vol. 24 (1976) 276–283, several suboptimal methods are known, such as those described by W. Sauer-Greff and R. A. Kennedy: "Suboptimal MLSE for distorted multiple-access channels using the M-algorithm," *Proc. Aachener Kolloquium Signal Theorie*, Aachen, March 1994, 267–270; K. S. Schneider: "Detection of code division multiplexed signals," *IEEE Trans. Aerosp. Electron. Syst.*, vol. AES-15 (1979), 181–185; R. Lupas and S. Verdu: "Linear multi-user detectors for synchronous code division multiple-access channels," *IEEE Trans. Inform. Theory*, vol. 35 (1989) 123–136; Z. Xie, R. T. Short and C. K. Rushforth: "A family of suboptimum detectors for coherent multi-user communications," *IEEE J Select. Areas Commun.*, vol. 8 (1990), 683–690; and A. Duel-Hallen: "Decorrelating decision-feedback multiuser detector for synchronous code-division multiple-access channels," *IEEE Trans. Commun.*, vol. 41(1993) 285–290.

If the pulse responses of the transmission channels of the coded data streams are known, interference caused by filtering can also be eliminated, as described by J. Salz: "Digital transmission over cross-coupled linear channels," *Bell Syst. Tech. J*, vol. 64 (1985), 1147–1159; A. Duel-Hallen: Equalizers for multiple input/multiple output channels and PAM systems with cyclostationary input sequences," *IEEE J. Select. Areas Commun.*, vol. 10 (1992) 630–639; and M. L. Honig, P. Crespo and K. Steiglitz: "Suppression of near- and far-end crosstalk by linear pre- and post-filtering," *IEEE J. Select. Areas Commun.*, vol. 10 (1992), pages 614–629.

The greatest disadvantage of multiuser detectors is their high computational complexity. Even suboptimal methods often cannot be implemented because of the computational complexity. On the other hand, the RAKE receiver, which is simple in computing terms, offers greatly inferior detection results.

SUMMARY OF THE INVENTION

Therefore, an object of the present invention is to create a multiuser detection method and a corresponding device based on available computing capacity.

The method according to the present invention for detecting CDMA-coded signals $\underline{d}=(\underline{d}^{(1)}, \ldots, \underline{d}^{(K)})$, where $\underline{d}^{(k)}=(\underline{d}_1^{(k)}, \ldots, \underline{d}_M^{(k)})$, $k=1, \ldots, K$, includes the following steps:

a) determining a first detection solution $\hat{\underline{d}}(1)$ of CDMA-coded signals $\underline{d}$;

b) calculating an (n+1)-th detection solution $\hat{\underline{d}}(n+1)$ by assigning $\hat{\underline{d}}(n+1)=f(\hat{\underline{d}}(n))$ as a function of n-th detection solution $\hat{\underline{d}}(n)$ for $n=1, \ldots, N$, where iteration for large values of n converges toward multiuser solution $\hat{\underline{d}}_{MU}$, i.e., $$f(\hat{\underline{d}}(n)) \xrightarrow[n \to \infty]{} \hat{\underline{d}}_{MU},$$

c) is the quality of approximation solution $\hat{\underline{d}}(n+1)$ is not sufficient, letting $n \to n+1$ and continuing the procedure with step b);

d) if the quality of solution $\hat{\underline{d}}(n+1)$ is sufficient, terminating the procedure and using $\hat{\underline{d}}(n+1)$ as the estimate of data $\underline{d}$ to be detected.

Symbols $\underline{d}^{(k)}$ to be transmitted can represent continuous or discrete data, the symbols preferably assuming values $\underline{d}^{(k)}=\pm 1, \pm i$ in the case of QPSK (quaternary phase shift keying) modulation.

The process preferably converges toward the solution of the zero forcing block linear estimator for $n \to \infty$.

Furthermore, the function of step b) can be formed by $$f(\hat{\underline{d}})=\hat{\underline{d}}+\delta \sim g$$

with a standardization factor $$\delta = \frac{\|g\|^2}{\|A \cdot g\|^2}$$

and an approximation term $$\underline{g}^T = A^H \sim (\underline{s}^T - A \sim \hat{\underline{d}}^T),$$

where matrix A is given by $$A = \begin{bmatrix} b^{(1)}_1 & 0 & \cdots \\ \vdots & \vdots & \\ b^{(1)}_Q & 0 & \vdots \\ \vdots & b^{(1)}_1 & \\ b^{(1)}_{Q+W-1} & \vdots & 0 \\ 0 & b^{(1)}_{Q+W-1} & b^{(K)}_1 \\ \vdots & \vdots & \vdots \\ 0 & 0 & \cdots & b^{(k)}_{Q+W-1} \end{bmatrix}$$

with $\underline{b}^{(k)}=\underline{c}^{(k)} \pm \underline{h}^{(k)}$ where $\underline{c}^{(k)}$ denotes the K different codes and $\underline{h}^{(k)}$ denotes the pulse responses of the K different linear transmission channels.

Solution $\hat{\underline{d}}^T(1)=A^H \underline{s}^T$ of the RAKE receiver is preferably used as the 1-st detection solution for starting the iteration. Furthermore, the first detection solution for starting the iteration can be set to zero.

A device according to the present invention for carrying out the method described above includes a data estimator for determining a first detection solution, an estimate improver for determining an improved detection solution and a decision circuit for deciding whether to continue the iteration.

The estimate improver preferably includes a unit for calculating an estimated transmission signal, a unit for calculating standardized approximation term δ~g and an adder for calculating the improved estimate. The unit for calculating standardized approximation term δ~g may have a unit for calculating approximation term g, a unit for calculating standardization factor δ and a multiplier for calculating the standardized approximation term.

A special advantage of the method according to the present invention is that the method requires only as much computing capacity as is available. The solution supplied is better than the solution of a RAKE receiver. If the available computing capacity is sufficient, the solution of the method according to the present invention approximates the solution of the multiuser method, i.e., the solution of the multiuser method is approximated by the method according to the present invention. By stipulating the time consumed by the method, it can be adapted easily to different complex detection functions, e.g., in the case of time-variable transmission channels of the CDMA system.

DETAILED DESCRIPTION

However, before giving a detailed explanation of the figures, the theory of the method will be outlined briefly.

Let there be K different discrete-time digital data streams $$\underline{d}^{(k)}=(d^{(k)}_1, d^{(k)}_2, \ldots, d^{(k)}_M)$$

Symbols $\underline{d}^{(k)}$ to be transmitted may represent continuous or discrete data. Digital data is preferably represented by linear modulation on discrete complex values of symbols $\underline{d}^{(k)}$, the symbols assuming values of $\underline{d}^{(k)}=\pm 1$ or $\pm i$, for example, in QPSK (quaternary phase shift keying) modulation.

Let these be CDMA coded with K different codes accordingly $$\underline{c}^{(k)}=(c^{(k)}_1, \ldots, c^{(k)}_Q)$$

to:

$$\underline{a}^{(k)}=(d^{(k)}_1 \sim c^{(k)}_1, \ldots, d^{(k)}_1 \sim c^{(k)}_Q, \ldots, d^{(k)}_M \sim c^{(k)}_1, \ldots, d^{(k)}_M \sim c^{(k)}_Q)$$

Let these K signals be filtered through K different linear transmission channels having the pulse responses as follows:

$$\underline{h}^{(k)}=(h^{(k)}_1, \ldots, h^{(k)}_W)$$

to:

$$\underline{s}^{(k)}=\underline{a}^{(k)}*\underline{h}^{(k)}$$

Transmitted signals $\underline{s}^{(k)}$ and an additional noise $\underline{n}$ are added up to a total signal:

$$s = \sum_{k=1}^{K} s^{(k)} + n.$$

With $$\underline{d}=(\underline{d}^{(1)}, \ldots, \underline{d}^{(K)}),$$

$$A = \begin{bmatrix} b^{(l)}_1 & 0 & \cdots \\ \vdots & \vdots & \\ b^{(l)}_Q & 0 & \vdots \\ \vdots & b^{(l)}_1 & \\ b^{(l)}_{Q+W-1} & \vdots & 0 \\ 0 & b^{(l)}_{Q+W-1} & b^{(K)}_1 \\ \vdots & \vdots & \vdots \\ 0 & 0 & \cdots & b^{(k)}_{Q+W-1} \end{bmatrix}$$

and $$\underline{b}^{(k)}=\underline{c}^{(k)}*\underline{h}^{(k)}$$

$\underline{s}$ can be expressed by a linear equation system:

$$\underline{s}^T=A\sim\underline{d}^T+\underline{n}^T$$

where $\underline{s}^T$ is the transposed term of vector $\underline{s}$.

Transmitted data streams can be estimated by a RAKE receiver from this receiver signal:

$$\hat{\underline{d}}^T=A^H\sim\underline{s}^T$$

where $A^H$ is the complex conjugated matrix transposed to A, and $\hat{\underline{d}}$ is the estimate of the data bits transmitted.

Better results are obtained with a multiuser method such as the zero dorcing block linear estimator:

$$\hat{\underline{d}}^T=(A^H\sim A)^{-1}\sim A^H\sim\underline{s}^T\sim$$

This solution may be approximated by iteration by repeated use of the following representation:

$$\hat{\underline{d}} \rightarrow \hat{\underline{d}}+\delta\sim g$$

where $$\delta = \frac{\|g^2\|}{\|A \cdot g\|^2}$$

and $$g^T=A^H\sim(\underline{s}^T-A\sim\hat{\underline{d}}^T).$$

This method therefore includes the following steps:
i) Set $\hat{\underline{d}}$ to first estimate $\hat{\underline{d}}(1)$ for $\underline{d}$.
ii) Set $\hat{\underline{d}}$ to improved ((n+1)-th) estimate $\hat{\underline{d}}+\delta\sim g$ with $$\delta = \frac{\|g^2\|}{\|A \cdot g\|^2} \text{ and } g^T = A^H \cdot (\underline{s}^T - A \cdot \hat{\underline{d}}^T).$$

iii) If no more computing time is available, $\hat{\underline{d}}$ is assumed to be an estimate for transmitted data $\underline{d}$; otherwise the iteration is continued with step ii).

If $\hat{\underline{d}}_j^{(k)}=0$ is assumed as starting values for data to be detected, this method yields the solution of the RAKE receiver in the first step.

Figure 1:
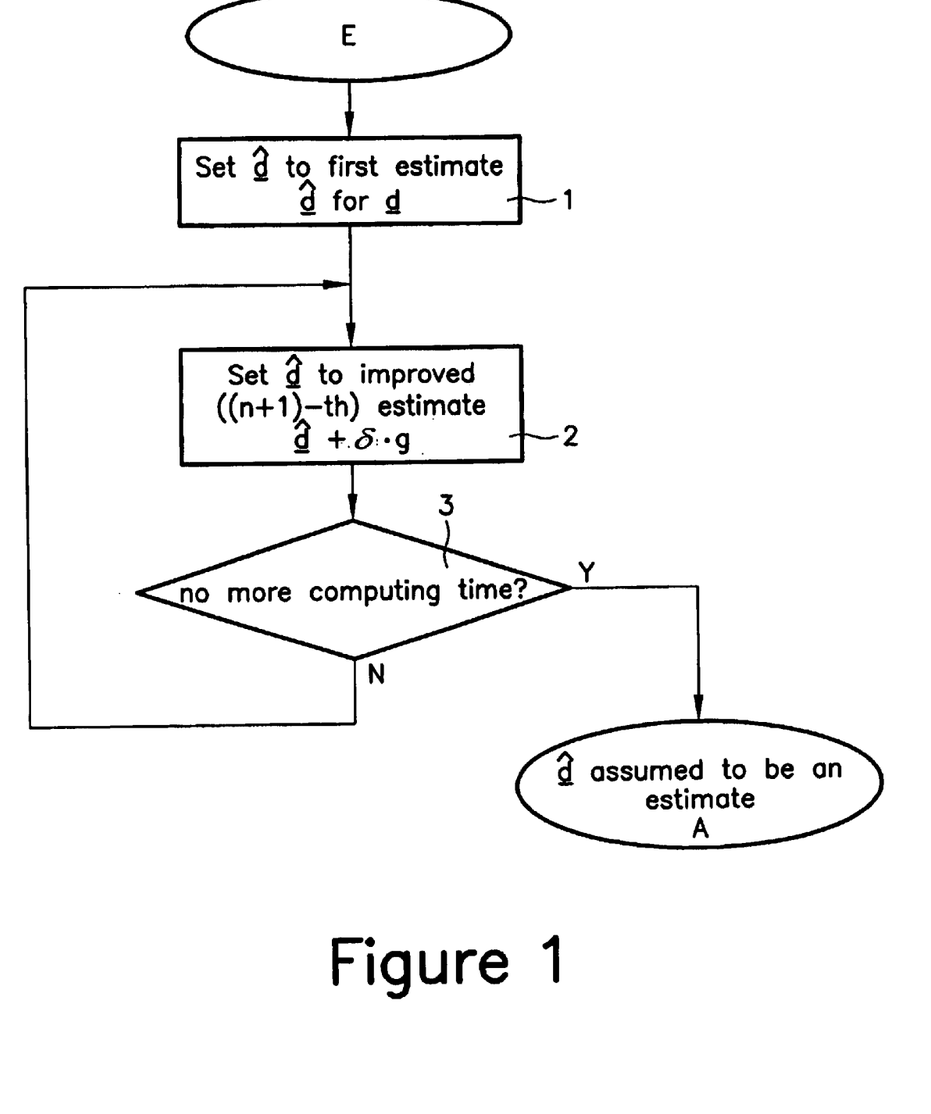
FIG. 1 shows a flow chart of the method according to the present invention.

This method is illustrated in FIG. 1. The total signal, the required codes and the channel pulse responses are available as input E. In a first step 1, detection solution $\underline{\hat{d}}$ is set to a first estimate $\underline{\hat{d}}$ (1) of transmitted data $\underline{d}$. In a second step 2, detection solution $\underline{\hat{d}}$ (2) is set to an improved estimate $\underline{\hat{d}}$ (1)+δ~g using the definitions given above for δ and g. Step 3 which follows determines whether no more computing time is available or whether the improvement is sufficient. If this is the case, the iteration is terminated and the improved estimate is used as the solution. However, if more computing time is available or if the improvement is not sufficient, the process returns to second step 2, the improved estimate is used as the starting value and another iteration step is performed.

Figure 2:
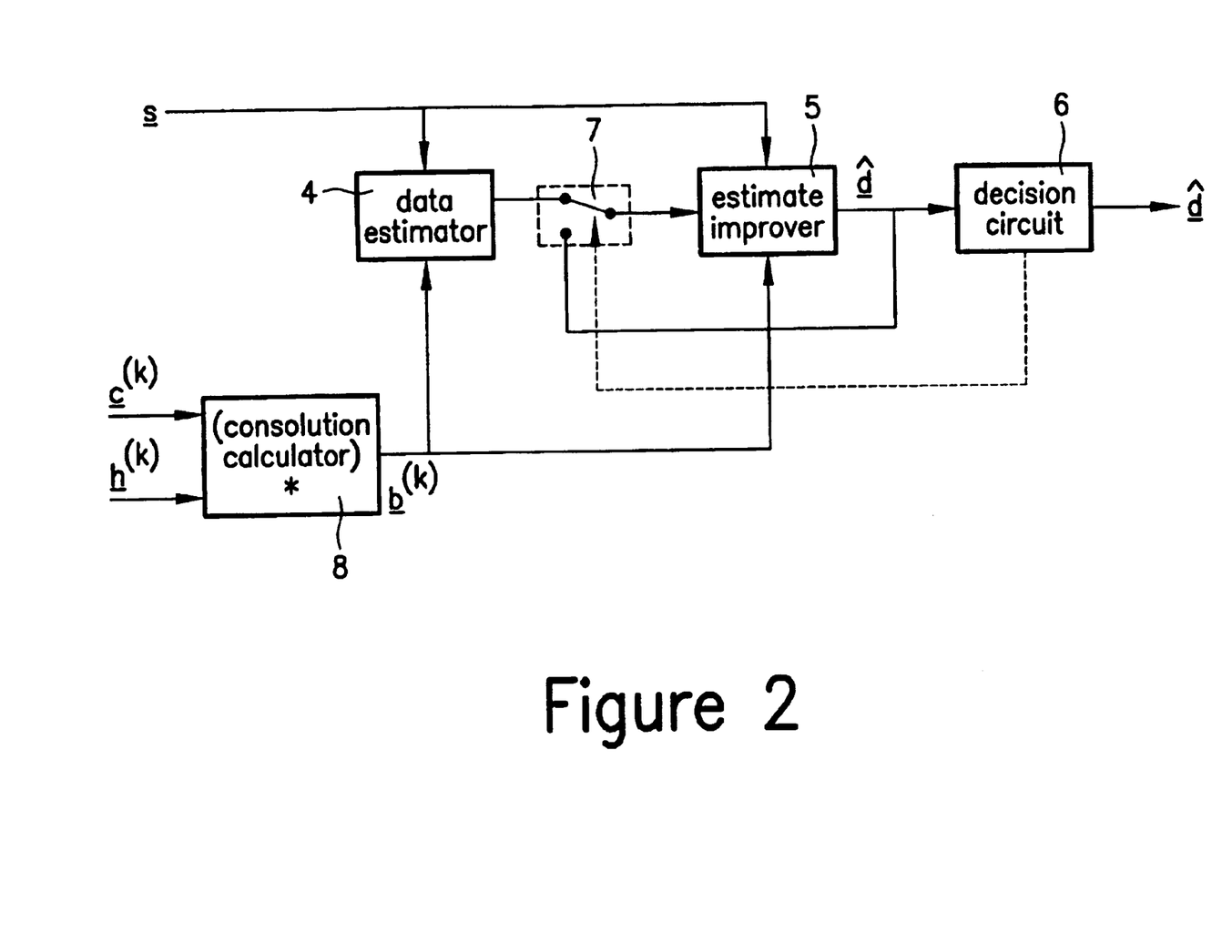
FIG. 2 shows a structural diagram of the detector.

FIG. 2 shows the structure of a detector which carries out the method described above. Input quantities include received signal $\underline{s}$ as well as codes $\underline{c}^{(k)}$ and pulse responses $\underline{h}^{(k)}$. In a data estimator 4, a first estimate of the data is made on the basis of these input quantities. This first estimate is entered into an estimate improver 5 via a double-throw switch 7. The first estimate of first data estimator 4 is improved in estimate improver 5 by using the method described above. A decision circuit 6 determines whether no more computing time is available or whether the improvement in the estimate is sufficient. In the case when more computing time is available and the improvement is not sufficient, the result of the first improvement is again sent as a new input value to the input of estimate improver 5 via double-throw switch 7, which is thrown. Therefore, iteration is continued. Otherwise, the estimate thus determined is used as the value of the data to be detected. Furthermore, the detector includes a convolution calculator 8 which calculates quantity $\underline{b}^{(k)}$ from codes $\underline{c}^{(k)}$ and channel pulse responses $\underline{h}^{(k)}$.

Figure 3:
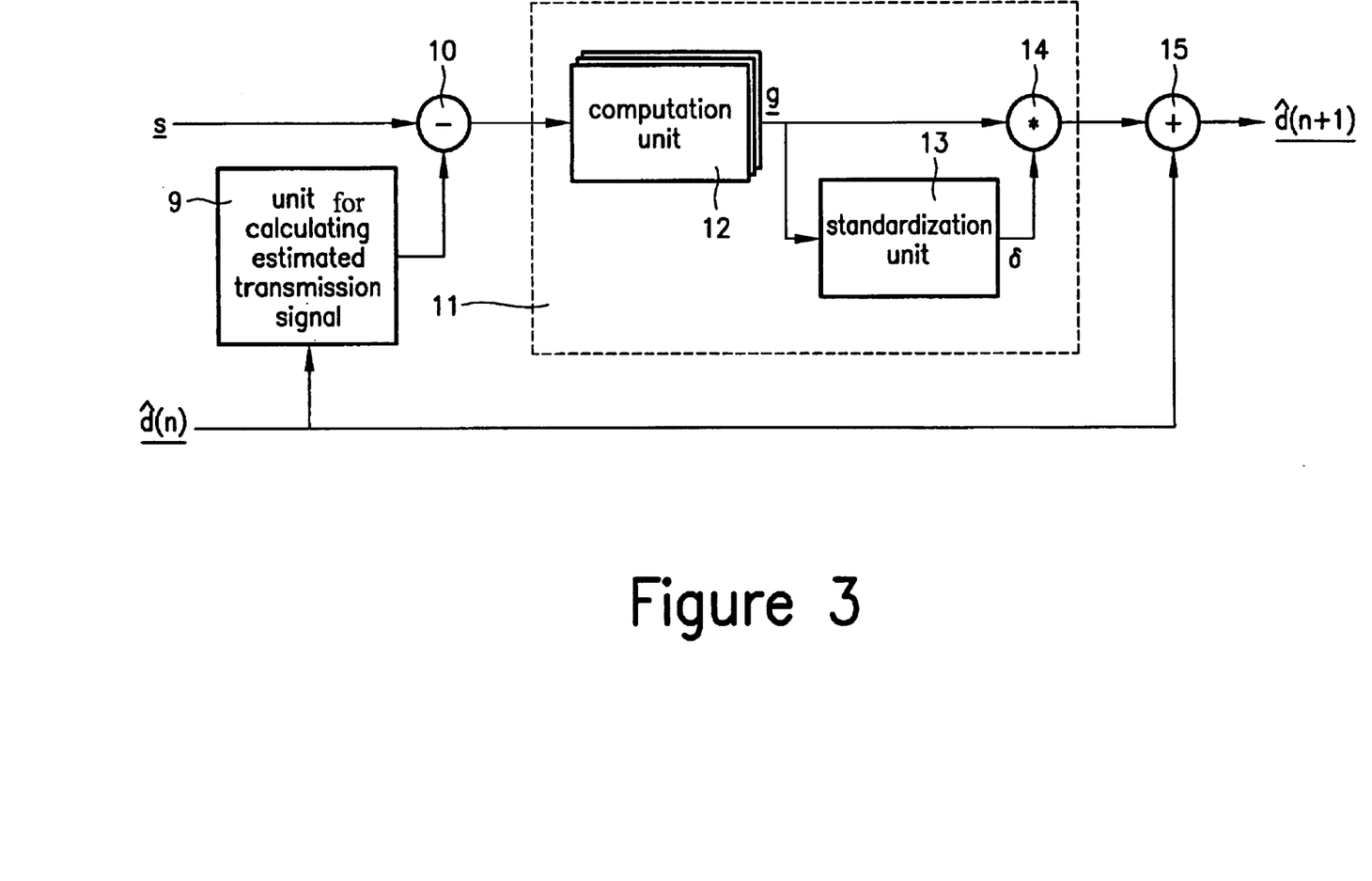
FIG. 3 shows a diagram of the estimate improver of the embodiment according to FIG. 2.

FIG. 3 shows a block diagram of a preferred embodiment of estimate improver 5 of FIG. 2. In a unit 9 for calculating the estimated transmission signal, the n-th estimate of the transmission signal is calculated with n-th estimate $\underline{\hat{d}}$ (n) of the data by calculating A~$\underline{\hat{d}}$ (n) and then is subtracted from received transmission signal $\underline{s}$ in a subtractor 10. In a unit 11, standardized approximation term δ~g is calculated from the difference. This unit 11 includes a computation unit 12 for multiplying the difference by transposed matrix $A^T$, thereby calculating n-th approximation term g. Furthermore, in a standardization unit 13, standardization factor δ is calculated from this term using the definition equation given above. Standardized approximation term δ~g is calculated in a multiplier 14 as the product of standardization factor δ and approximation term g. Then (n+1)-th estimate $\underline{\hat{d}}$ (n+1) is formed in an adder 15 by addition of n-th estimate $\underline{\hat{d}}$ (n) and standardized (n)-th approximation term δ~g.

What is claimed is:

1. A method for detecting CDMA-coded signals $\underline{d}=(\underline{d}^{(1)}, \ldots, \underline{d}^{(K)})$, when $\underline{d}^{(k)}=(\underline{d}_1^{(k)}, \ldots, \underline{d}_M^{(k)})$, k=1, ..., K, comprising the steps of:

determining a first detection solution $\underline{\hat{d}}$ (1) of CDMA-coded signals $\underline{d}$;

determining an (n+1)-th detection solution $\underline{\hat{d}}$ (n+1) for n=1, ..., N as a function of the n-th detection solution $\underline{\hat{d}}$ (n) by assigning $$\underline{\hat{d}}(n+1)=f(\underline{\hat{d}}(n))$$

where iteration for n→∞ converges toward multiuser solution $\underline{\hat{d}}_{MU}$ corresponding to $$f(\underline{\hat{d}}(n)) \xrightarrow[n\to\infty]{} \underline{\hat{d}}_{MU},$$

is a quality of approximation solution $\underline{\hat{d}}$ (n+1) is not sufficient, assigning n→n+1 and continuing performing the step of determining the (n+1)-th detection solution;

if the quality of approximate solution $\underline{\hat{d}}$ (n+1) is sufficient, terminating the method and using $\underline{\hat{d}}$ (n+1) as an estimate of data $\underline{d}$ to be detected, wherein:

the function of the step of determining the (n+1)-th detection solution is given by $$f(\underline{\hat{d}})=\underline{\hat{d}}+\delta\sim\underline{g}$$

with $$\delta = \frac{\|g^2\|}{\|A\cdot g\|^2} \text{ and } g^T = A^H \cdot \left(s^T - A\cdot \underline{\hat{d}}^T\right)$$

where matrix A is given by $$A = \begin{bmatrix} b^{(l)}{}_1 & 0 & \cdots \\ \vdots & \vdots & \\ b^{(l)}{}_Q & 0 & \vdots \\ \vdots & b^{(l)}{}_1 & \\ b^{(l)}{}_{Q+W-1} & \vdots & 0 \\ 0 & b^{(l)}{}_{Q+W-1} & b^{(K)}{}_1 \\ \vdots & \vdots & \vdots \\ 0 & 0 & \cdots & b^{(k)}{}_{Q+W-1} \end{bmatrix}$$

with $\underline{b}^{(k)}=\underline{c}^{(k)}*\underline{h}^{(k)}$, where $\underline{c}^{(k)}$ denotes the K different codes and $\underline{h}^{(k)}$ denotes pulse responses of K different linear transmission channels.

2. The method according to claim 1, further comprising the step of:

converging toward a solution of a zero forcing block linear estimator for n→∞.

3. The method according to claim 1, wherein:

symbols $d^{(k)}$ to be transmitted assume values of ±1 or ±i.

4. The method according to claim 1, wherein:

solution $\underline{\hat{d}}^T(n)=A^H\sim\underline{s}^T$ of a RAKE receiver is used as the 1-st detection solution for starting the iteration.

5. The method according to claim 1, wherein:

a first one of the detection solution for starting the iteration is set to zero.

6. A device, comprising:

a data estimator for determining a first detection solution;

an estimate improver for determining an improved detection solution; and a decision circuit for deciding whether to continue an iteration.

7. The device according to claim 6, wherein:

the estimate improver includes a unit for calculating an estimated transmission signal, a unit for calculating standardized approximation term δ~g, and an adder for calculating an improved estimate.

8. The device according to claim 7, wherein:

the unit for calculating standardized approximation term δ~g includes a unit for calculating approximation term g, a unit for calculating standardization factor δ, and a multiplier for calculating the standardized approximation term.

* * * * *

UNITED STATES PATENT AND TRADEMARK OFFICE
CERTIFICATE OF CORRECTION

PATENT NO. : 7,042,861 B1
APPLICATION NO. : 09/786945
DATED : May 9, 2006
INVENTOR(S) : Frank Kowalewski It is certified that error appears in the above-identified patent and that said Letters Patent is hereby corrected as shown below:

Column 2, line 14 change "is the quality" to --if the quality--

Column 2, line 28 change from "δ~$\underline{g}$" to -- $\delta \cdot \underline{g}$ --

Column 2, line 37, change from "$\underline{g}^{T=A}$~($\underline{S}^T$ - A~$\underline{\hat{d}}^T$)," to
--$\underline{g}^{T=A^H} \cdot \left(\underline{S}^T - A \cdot \underline{\hat{d}}^T\right)$, --

Column 3, line 3, change from "δ~$\underline{g}$" to -- $\delta \cdot \underline{g}$ --

Column 3, line 5, change from "δ~$\underline{g}$" to -- $\delta \cdot \underline{g}$ --

Column 3, line 6, change from "approximation term $\underline{g}$" to
--approximation term $\underline{g}$ --

Column 3, line 55, change from
"$\underline{a}^{(k)} = (d^{(k)}_1 \sim c^{(k)}_1,...,d^{(k)}_1 \sim c^{(k)}_Q,...,d^{(k)}_M \sim c^{(k)}_1,...,d(k)_M \sim c^{(k)}_Q)$" to
$\underline{a}^{(k)} =$
-- $\left(d^{(k)}_1 \cdot c^{(k)}_1,...,d^{(k)}_1 \cdot c^{(k)}_Q,...,d^{(k)}_M \cdot c^{(k)}_1,...,d^{(k)}_M \cdot c^{(k)}_Q\right)$ --

Column 4, line 28, change from "$\underline{S}^T$ = A~$\underline{d}^T$+$\underline{n}^T$" to --$\underline{S}^T$ = A·$\underline{d}^T$+$\underline{n}^T$--

Column 4, line 33, change from "$\underline{\hat{d}}^T = A^H \sim \underline{S}^T$" to -- $\underline{\hat{d}}^T = A^H \cdot \underline{S}^T$ --

Column 4, line 39, change from "$\underline{\hat{d}}^T = (A^H \sim A)^{-1} \sim A^H \sim \underline{S}^T \sim$" to
--$\underline{\hat{d}}^T = (A^H \cdot A)^{-1} \cdot A^H \cdot \underline{S}^T$ ·--

Column 4, line 43, change "+δ~$\underline{g}$" to --$+\delta \cdot \underline{g}$ --

Column 4, line 47, change from "$\delta = \dfrac{\|\underline{g}^2\|}{\|A \cdot \underline{g}\|^2}$" to --$\delta = \dfrac{\|\underline{g}\|^2}{\|A \cdot \underline{g}\|^2}$ --

Column 5, line 37, change from "δ~$\underline{g}$" to -- $\delta \cdot \underline{g}$ --

UNITED STATES PATENT AND TRADEMARK OFFICE
CERTIFICATE OF CORRECTION

PATENT NO.        : 7,042,861 B1
APPLICATION NO.   : 09/786945
DATED             : May 9, 2006
INVENTOR(S)       : Frank Kowalewski It is certified that error appears in the above-identified patent and that said Letters Patent is hereby corrected as shown below:

Column 5, line 40, change from "approximation term $g$" to --approximation term $\underline{g}$--

Column 5, line 43, change from "δ~g" to -- $\delta \cdot \underline{g}$ --

Column 5, line 45, change from "approximation term $g$" to --approximation term $\underline{g}$--

Column 5, line 47, change from "approximation term δ~g" to -- approximation term $\delta \cdot \underline{g}$ --

Column 5, line 65, change from "is a quality" to -- if a quality--

Column 6, line 7, change from "δ~g" to -- $\delta \cdot \underline{g}$ --

Column 6, line 12, change from " $\delta = \dfrac{\|\underline{g}^2\|}{\|A \cdot \underline{g}\|^2}$ " to -- $\delta = \dfrac{\|\underline{g}\|^2}{\|A \cdot \underline{g}\|^2}$ --

Column 6, line 58, change from "approximation term δ~g" to -- approximation term $\delta \cdot \underline{g}$ --

UNITED STATES PATENT AND TRADEMARK OFFICE
CERTIFICATE OF CORRECTION

PATENT NO. : 7,042,861 B1  Page 3 of 3
APPLICATION NO. : 09/786945
DATED : May 9, 2006
INVENTOR(S) : Frank Kowalewski It is certified that error appears in the above-identified patent and that said Letters Patent is hereby corrected as shown below:

Column 6, line 62, change from "δ~g includes" to -- $\delta \cdot \underline{g}$ includes --

Signed and Sealed this

Thirtieth Day of October, 2007

JON W. DUDAS
*Director of the United States Patent and Trademark Office*